(12) United States Patent
Mizoguchi et al.

(10) Patent No.: US 6,374,040 B2
(45) Date of Patent: *Apr. 16, 2002

(54) PORTABLE DVD PLAYER

(75) Inventors: Tetsuya Mizoguchi; Masayuki Sato; Hiroyuki Sakamoto, all of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/739,322

(22) Filed: Dec. 19, 2000

Related U.S. Application Data (63) Continuation of application No. 08/947,019, filed on Oct. 18, 1997, now Pat. No. 6,169,847.

(30) Foreign Application Priority Data

Oct. 9, 1996 (JP) .............................................. 8-268723

(51) Int. Cl.[7] .............................................. H04N 5/917
(52) U.S. Cl. ...................... 386/125; 386/111; 386/126
(58) Field of Search ............................... 386/125–126, 386/95–96, 111, 46, 35, 109, 118, 124; H04N 5/917

(56) References Cited

U.S. PATENT DOCUMENTS

| | | | |
|---|---|---|---|
| 4,897,827 A | 1/1990 | Raetzer et al. ............... 386/126 |
| 5,309,249 A | 5/1994 | Ishii ............................. 386/126 |
| 5,347,630 A | 9/1994 | Ishizawa et al. ............. 395/164 |
| 5,499,221 A | 3/1996 | Ito et al. ....................... 369/32 |
| 5,507,072 A | 4/1996 | Youn ............................. 16/261 |
| 5,557,593 A | 9/1996 | Bailey .......................... 369/59 |
| 5,612,520 A | 3/1997 | Toedtman et al. ........ 200/16 D |
| 5,691,972 A | 11/1997 | Tsuga et al. ............. 369/275.3 |
| 5,699,434 A | 12/1997 | Hogan .......................... 380/49 |
| 5,703,997 A | 12/1997 | Kitamura et al. ............. 386/97 |
| 5,712,949 A | 1/1998 | Kato et al. .................... 386/96 |
| 5,754,648 A | 5/1998 | Ryan et al. .................... 380/4 |
| 5,796,576 A | 8/1998 | Kim .............................. 361/681 |
| 5,796,839 A | 8/1998 | Ishiguro ....................... 380/44 |
| 5,825,879 A | 10/1998 | Davis ............................ 380/5 |
| 5,835,083 A | 11/1998 | Nielsen et al. ............. 345/211 |
| 5,861,873 A | 1/1999 | Kikinis ........................ 345/157 |
| 5,896,358 A | 4/1999 | Endoh et al. ................. 369/89 |
| 5,905,914 A | 5/1999 | Sakai et al. ................. 395/887 |
| 5,914,706 A | 6/1999 | Kono .......................... 345/173 |
| 5,933,430 A | 8/1999 | Osakabe et al. ............ 370/395 |
| 6,006,286 A | 12/1999 | Baker et al. .................. 710/22 |
| 6,169,847 B1 * | 1/2001 | Mizoguchi et al. ......... 386/111 |

FOREIGN PATENT DOCUMENTS

| | | | | |
|---|---|---|---|---|
| EP | 0389261 A | * | 9/1990 | ........... G11B/31/00 |
| JP | 7-203348 | | 8/1995 | |

* cited by examiner

Primary Examiner—Vincent F. Boccio
(74) Attorney, Agent, or Firm—Finnegan, Henderson, Farabow, Garrett,& Dunner, L.L.P.

(57) ABSTRACT

The built-in components in the portable-type apparatus each operate on power from the power supply (PS) unit having a built-in battery. The video data decoded by the video decoder (MPEG-DEC) and the sub-picture data decoded by the sub-picture decoder (Sub-Picture-DEC)are mixed with the video mixer (MIX) and then output to a display unit (DISP). An audio signal decoded by the audio decoder (Audio-DEC) is output from the speaker (SP).

9 Claims, 5 Drawing Sheets

PORTABLE DVD PLAYER

This is a continuation of Ser. No. 08/947,019, filed Oct. 18, 1997 now U.S. Pat. No. 6,169,847 which is incorporated herein by reference.

BACKGROUND OF THE INVENTION

The present invention relates to a portable DVD (Digital Versatile Disk) player which includes in a single frame a disk drive having a DVD loading, a power supply for driving, and a unit outputting video and audio data, which is capable of reproducing data recorded in the DVD while carrying.

Recording still picture data and audio picture data requires a high density and large capacity storage media. For this reason, conventionally, a compact disk apparatus (hereinafter referred to as CD) has been used for recording digital data, and a laser disk apparatus (hereinafter referred to as LD) has been used for recording image data. However, the CD is insufficient in capacity as an information recording media for multimedia, while the LD is not available as an recording media for computer due to analogue recording. Therefore, a recording method and a media for a large recording capacity have been expected. In order to fulfill such needs, a DVD technique has been recently developed. In comparison with the CD, a single side of the DVD gives a recording capacity approximately seven times as much as the CD, whereas in comparison with the LD, a single side of the DVD gives a recording time approximately 2.2 times as much as the LD.

Conventionally, two DVD applications have been developed, namely a DVD video player and a DVD-ROM driver. The DVD video player reproduces still picture data/motion picture data, audio signal from the DVD, and transfers the data and signals to a home television set (hereinafter referred to as TV), whereby the TV reproduces them. The DVD-ROM reproduces video/motion picture data, audio signal, or digital data from the DVD, and transfers them to a personal computer (hereinafter referred to as PC), whereby the PC outputs them on a display and to a speaker.

However, none of the above apparatus has been designed from a view point of portability and thus such apparatus is not suited for outdoor use or mobile use. Accordingly, there has not conventionally existed any portable disk-reproducing apparatus capable of continuously reproducing video and audio data for long hours, which fails to satisfy the desire of enjoying long-time programs such as movies while carrying.

BRIEF SUMMARY OF THE INVENTION

It is therefore an object of the present invention to provide a portable DVD player capable of reproducing data recorded on the DVD while carrying.

Further, it is another object of the present invention to provide a portable DVD reproducing apparatus capable of reproducing data recorded on the DVD while carrying, and of serving as a stand-alone type or a terminal of personal computer depending on applications.

According to one aspect of the present invention, there is provided a portable DVD player which comprises in a single frame a disk drive having a DVD loading mechanism, a power supply for driving, and an output unit outputting video and audio data, and which is capable of reproducing data recorded in the DVD while carrying.

More specifically, a portable DVD player having a single frame provided with a DVD loading mechanism according to the present invention, comprises in the frame a disk drive reading stream data recorded in the DVD by rotating the DVD loaded on the DVD loading mechanism; an MPEG decoder reproducing video data from DVD stream data read by the disk drive; a sub-picture decoder reproducing sub picture from the DVD stream data read by the disk drive; an audio decoder reproducing audio data from the DVD stream data read by the disk drive; a system controller controlling system components each in the frame; and a power supply unit including a built-in battery supplying the system components each with power supply for operation thereof, thereby enabling reproducing data recorded in the DVD while carrying in arbitrary places as well as indoors.

Further, a portable DVD player having a single frame provided with a DVD loading mechanism according to the present invention, comprises in the frame a disk drive reading stream data recorded in the DVD by rotating the DVD loaded on the DVD loading mechanism; an MPEG decoder reproducing video data from DVD stream data read by the disk drive; a sub-picture decoder reproducing sub picture data from the DVD stream data read by the disk drive; an audio decoder reproducing audio data from the DVD stream data read by the disk drive; a conversion circuit and an output terminal mixing the reproduced video data and the sub-picture data, and outputting the mixed image data to an external monitor; a system controller controlling system components each in the frame; and a power supply unit including a built-in battery supplying the system components each with power supply for operation thereof, thereby enabling serving to drive an external large screen monitor, in addition to reproducing data recorded in the DVD while carrying at arbitrary places as well as indoors.

Moreover, a portable DVD player having a single frame provided with a DVD loading mechanism according to the present invention, comprises in the frame a disk drive reading stream data recorded in the DVD by rotating the DVD loaded on the DVD loading mechanism; an MPEG decoder reproducing video data from DVD stream data read by the disk drive; a sub-picture decoder reproducing sub-picture data from the DVD stream data read by the disk drive; an audio decoder reproducing audio data from the DVD stream data read by the disk drive; a conversion circuit and an output terminal mixing the reproduced video data and the sub-picture data, and outputting the mixed data to an external monitor; a communication port outputting the DVD stream data to external; a system controller controlling system components each in the frame; and a power supply unit including a built-in battery supplying the system components each with power supply for operation thereof, thereby enabling serving as a personal computer terminal, in addition to reproducing data recorded in the DVD while carrying in arbitrary places as well as indoors, and serving to driving an external screen monitor.

Furthermore, a portable DVD player having a single frame provided with a DVD loading mechanism according to the present invention, comprises in the frame a disk drive reading stream data recorded in the DVD by rotating the DVD loaded on the DVD loading mechanism; an MPEG decoder reproducing video data from DVD stream data read by the disk drive; a sub-picture decoder reproducing sub-picture data from the DVD stream data read by the disk drive; an audio decoder reproducing audio data from the DVD stream data read by the disk drive; a conversion circuit and an output terminal mixing the reproduced video data and the sub-picture data, and outputting the mixed data to an external monitor; a communication port selectively outputting one of the DVD stream data and the mixed data to external; a system controller controlling system components each in the frame; and a power supply unit including a built-in battery supplying the system components each with power supply for operation thereof, thereby enabling serving as a stand-alone machine and a personal computer terminal in addition to reproducing data recorded in the DVD while carrying in arbitrary places as well as indoors, and serving to drive an external large screen monitor.

Further, a portable information processor according to the present invention comprises a displaying and outputting mechanism mixing and displaying the main image decoded by the MPEG decoder and the sub image decoded by the sub-picture decoder; and a voice outputting mechanism outputting voice regenerated by the audio decoder.

Moreover, in a portable DVD player according to the present invention, the displaying and outputting mechanism includes a flat panel display attachable and removable to/from the frame.

Furthermore, a portable DVD player according to the present invention comprises a communication port pursuant to one of SCSI interface, IEEE1393 interface, PC card interface, and USB (Universal Serial Bus) interface, wherein the portable DVD player encrypts data output via the communication port if necessary.

Also, in a portable DVD player according to the present invention, the audio data outputting mechanism includes at least one of a speaker, a headphone jack, a digital audio terminal, and an AC-3 audio terminal.

Further, in a portable DVD player according to the present invention, the disk drive drives at least the DVD and a CD-ROM as a recording media to reproduce.

Moreover, a portable DVD player according to the present invention comprises a DVD stream data dedicated signal path transferring the DVD stream data read from the disk drive, to the MPEG decoder, the sub-picture decoder, and the audio decoder.

Furthermore, a portable DVD player according to the present invention comprises decryption means for decrypting encrypted stream data on the stream data dedicated signal path.

Additional objects and advantages of the invention will be set forth in the description which follows, and in part will be obvious from the description, or may be learned by practice of the invention. The objects and advantages of the invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 5A and 5B are diagrams showing sequences of commands and data between the portable DVD player and the computer, wherein FIG. 5A shows a case where the portable DVD player selectively outputs the encoded stream data, and FIG. 5B shows a case where the portable DVD player selectively outputs the decoded video/audio data for reproduction.

DETAILED DESCRIPTION OF THE INVENTION

An embodiment of the portable DVD player according to the present invention will now be described with reference to the accompanying drawings.

Figure 1:
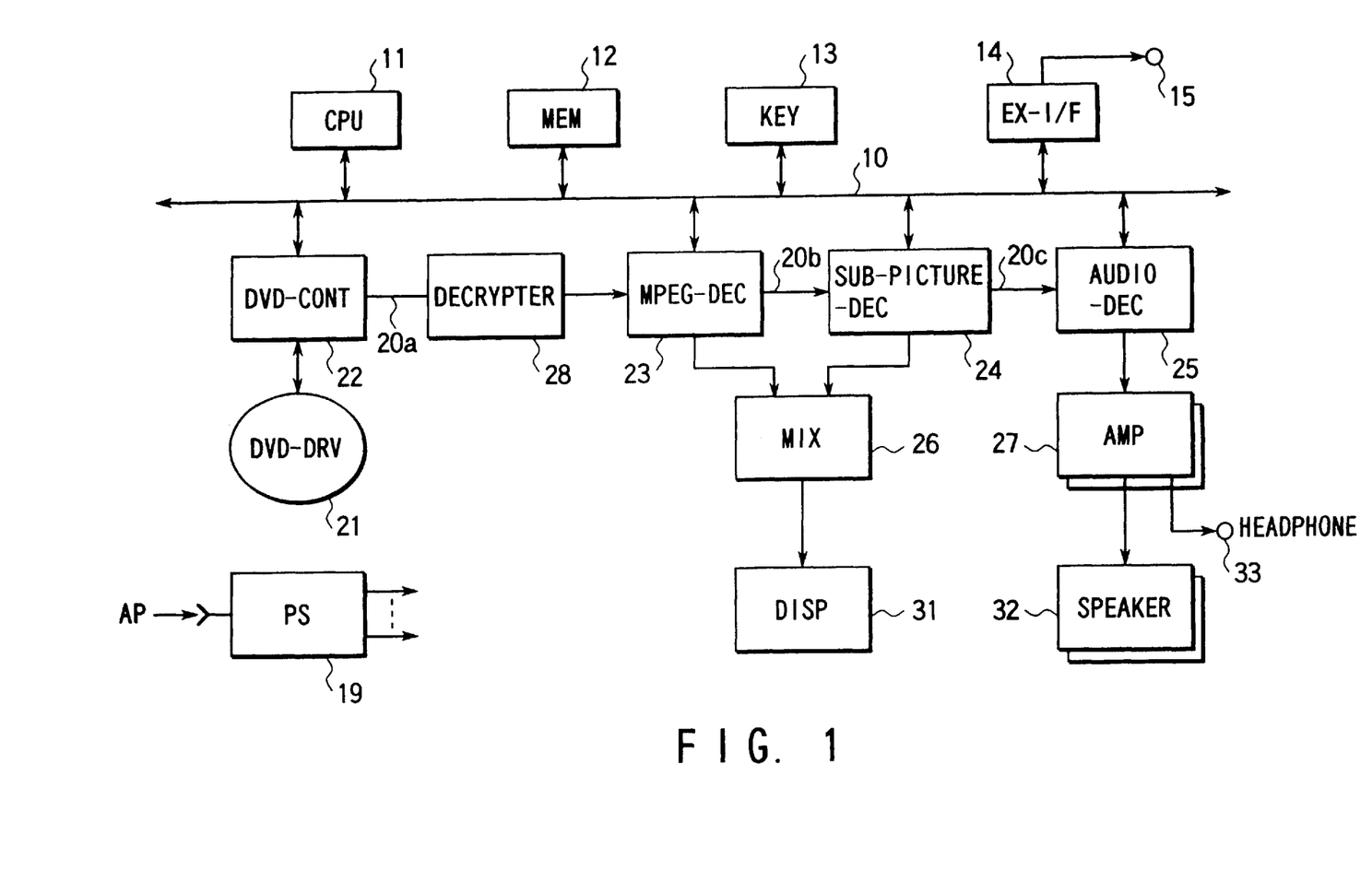
FIG. 1 is a block diagram showing an arrangement within a frame of the portable-type DVD player according the first embodiment of the present invention.

FIG. 1 is a block diagram showing an arrangement within a frame of a portable DVD player according to the first embodiment of the present invention.

In FIG. 1, the portable DVD player having a single frame incorporates an internal system bus 10, a CPU 11, an internal memory (MEM) 12, an operating keyboard (KEY) 13, a communication interface (EX-I/F) 14, a communication port 15, a power supply (PS) 19, a DVD driving mechanism (DVD-DRV) 21, a DVD controller (DVD-CONT) 22, an MPEG decoder (MPEG-DEC) 23, a sub-picture decoder (Sub-Picture-DEC) 24, an audio decoder (Audio-DEC) 25, a video mixer (MIX) 26, an audio amplifier (AMP) 27, a decrypter 28, a display (DISP) 31, and a speaker 32.

The CPU 11 controls the whole system via the internal system bus 10. The internal memory (MEM) 12 includes a ROM and a RAM for use in a storage area for a variety of programs such as a system control program executed by the CPU 11, a working area of the CPU 11, and a data buffer area.

The keyboard (KEY) 13 is provided with various keys for controlling DVD reproduction, a pointing device such as ACCUPOINT and the like, and is used for turning on/off the system, instructing a control of various reproduction of frames and still pictures, and specifying coordinates on a display screen.

The communication interface (EX-I/F) 14 outputs data within the processor externally. The communication port 15 is a bi-directional communication port, which can be implemented by a communication port such as SCSI, IEEE1394, and PC card interface.

The power supply (PS) 19 has a built-in battery providing a variety of function circuits in the portable DVD player, with power supply for operation thereof. In this embodiment, a secondary battery is employed as the built-in battery, and an external power supply (AP) serves to enable charging of the secondary battery and operating of the system.

The DVD drive mechanism (DVD-DRV) 21 drives the DVD. The DVD controller (DVD-CONT) 22 controls the DVD drive mechanism (DVD-DRV) 21 under the control of the CPU 11.

The DVD controller (DVD-CONT) 22 temporarily stores in the data buffer area of the internal memory (MEM) 12, the DVD stream data read out of the DVD drive mechanism (DVD-DRV) 21, and subsequently sends them to the MPEG decoder (MPEG-DEC) 23, the sub-picture decoder (Sub-Picture-DEC) 24, and the audio decoder (Audio-DEC) 25 via the DVD stream data dedicated signal paths 20a, 20b, and 20c. In addition, on the DVD stream data dedicated signal path 20a, provided is the decrypter 28 which decrypts the stream data read out of the DVD when they are encrypted. The decrypter 28 is constituted using one of well-known arts.

The video decoder (MPEG-DEC) 23 extracts and decodes video data such as motion picture data from the DVD stream data received from the DVD controller (DVD-CONT) 22 via the DVD stream data dedicated signal path 20a, and outputs decoded video data.

The sub-picture decoder (Sub-Picture-DEC) 24 extracts and decodes sub-picture data from the DVD stream data received from the DVD controller (DVD-CONT) 22 via the stream data dedicated signal path 20b, and outputs the still picture data.

The audio decoder (Audio-DEC) 25 includes an A/D converter which extracts and decodes audio data from the DVD stream data received from the DVD controller (DVD-CONT) 22 via the DVD stream data dedicated signal path 20c, and outputs the audio signal.

The video mixer (MIX) 26 mixes the motion picture data serving as video data decoded by the video decoder (MPEG-DEC) 23, and the sub-picture data decoded by the sub-picture decoder (Sub-Picture-DEC) 24 to generate reproduced output image for display.

The audio amplifier (AMP) 27 amplifies the audio signal (in this embodiment, two channel stereo signal for L/R) decoded by the audio decoder (Audio-DEC) 25.

The display (DISP) unit 31 is comprised of a flat panel display, which displays the regeneration output image generated by the video mixer (MIX) 26.

The speaker 32 outputs the two channel stereo signal amplified by the audio amplifier (AMP) 27 as audible sound. In this embodiment, the speaker 32 is attached on the panel of the display (DISP) unit 31, and is provided with a switch mechanism inhibiting operation of the speaker 32 while a headphone is connected to the headphone jack 33.

Figure 4:
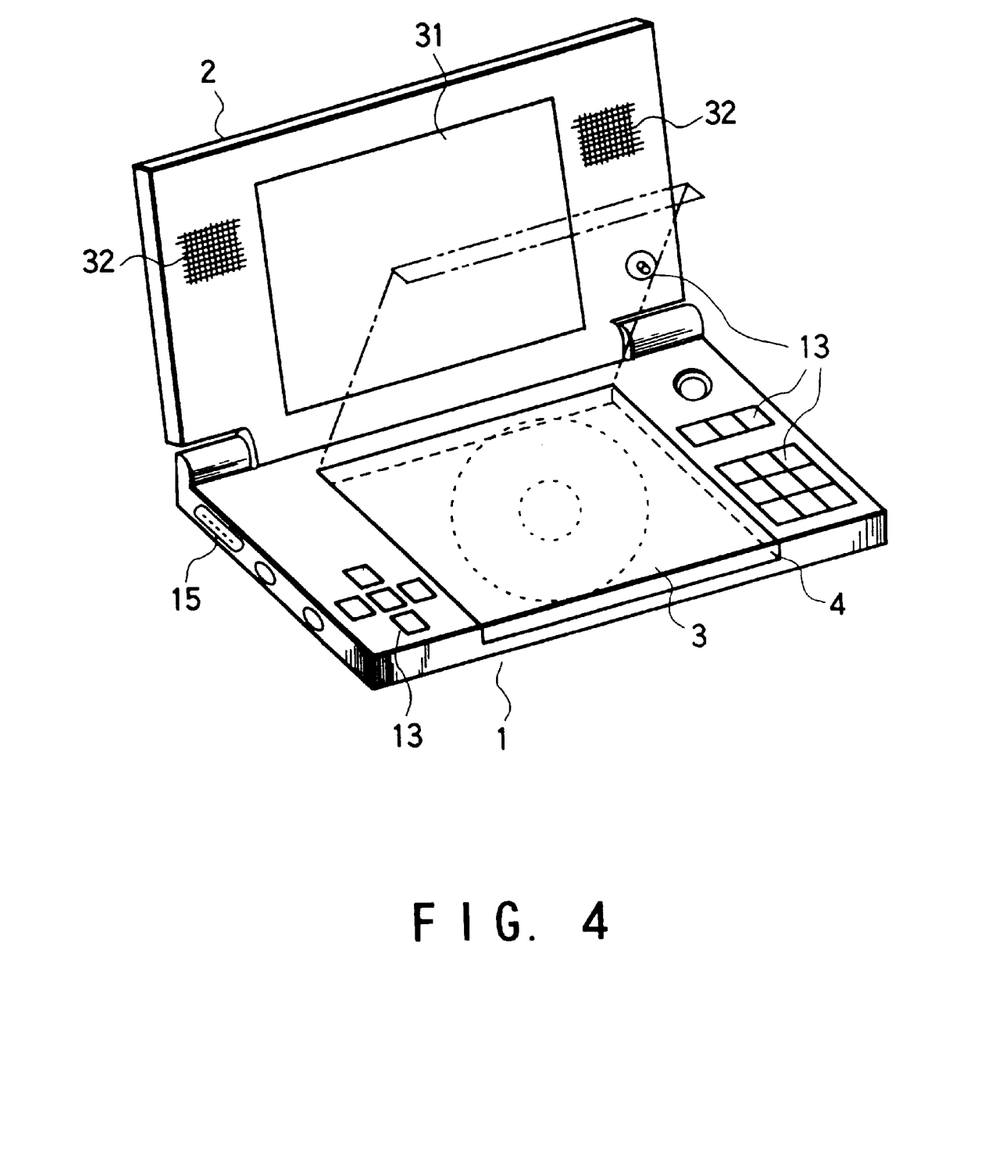
FIG. 4 is a block diagram showing an arrangement within a frame of the portable-type DVD player according to the fourth embodiment of the present invention.

FIG. 4 illustrates the outer appearance of the portable DVD player having the arrangement as described above. The same numerals are used for the same parts as shown in FIG. 1.

In FIG. 4, the frame of the portable DVD player has an input section (KEY) which is provided with various keys, a pointing device such as ACCUPOINT and the like for the control of the DVD reproduction. Moreover, the DVD loading mechanism 3, and the cover 4 which opens when loading the DVD to the DVD loading mechanism 3, are provided.

The cover unit 2 is rotatably and detachably provided in the frame 1 of the DVD player, and also provided with the display (DISP) unit 31, and the speaker 32 so as to allow them to be operable when the cover unit 2 is opened.

An operation of the portable DVD player constructed as above will now be described.

For reproducing the DVD, the cover unit 2 and the cover 4 are opened, the DVD is loaded at a given position, and the cover 4 is closed.

Thereafter, the power on/off switch of the input section (KEY) 13 is operated to thereby supply power from the power (PS) 19 to each system components. Thus, the reproduction process is executed in accordance with the instruction of the input unit (KEY) 13.

An operation of each components in the ordinary dynamic DVD player reproduction process will now be explained.

The DVD controller (DVD-CONT) 22 controls DVD drive mechanism (DVD-DRV) 21 under the control of the CPU 11 to read the DVD stream data out of the DVD loaded on the DVD loading mechanism 3. The DVD-CONT 22 temporarily stores the DVD stream data in the data buffer area of the internal memory (MEM) 12, and thereafter transfers them to the video decoder (MPEG-DEC) 23, the sub-picture decoder (Sub-Picture-DEC) 24, and the audio decoder (Audio-DEC) 25 via the DVD stream data dedicated signal paths 20a, 20b, and 20c, respectively. At this time, if the stream data has undergone an encryption process, the decrypter 28 executes a decryption process on the stream data on the DVD stream dedicated signal path 20a prior to transferring them.

Upon receipt of the DVD stream data from the DVD controller (DVD-CONT) 22 via the dedicated signal path 20a, the video decoder (MPEG-DEC) 23 extracts and decodes the motion picture data from the DVD-CONT 22, and outputs them.

Upon receiving the DVD stream data from the DVD controller (DVD-CONT) 22 via the path 20b, the sub-picture decoder (Sub-Picture-DEC) 24 extracts and decodes the sub-picture data therefrom, and outputs them.

Upon receipt of the DVD stream data from the DVD controller (DVD-CONT) 22 via the path 20c, the audio decoder (Audio-DEC) 25 extracts and decodes the audio data from the DVD-CONT 22, and outputs them.

The motion picture data serving as the video data decoded by the video decoder (MPEG-DEC) 23 and the sub-picture data decoded by the sub-picture decoder (Sub-Picture-DEC) 24 are mixed by the video mixer (MIX) 26 to generate the reproduced output image signal for display. The reproduced output image signal is forwarded to the display (DISP) unit 31 for display.

The audio signal decoded by the audio decoder (Audio-DEC) 25 is amplified by the audio amplifier (AMP) 27 and supplied to the speaker 32 for the output of the stereo sound. If the headphone is connected to the headphone jack 33, it is driven in place of the speaker 32. In this way, data recorded in the DVD can be reproduced by the battery power supply while carrying in arbitrary places as well as indoors.

Figure 2:
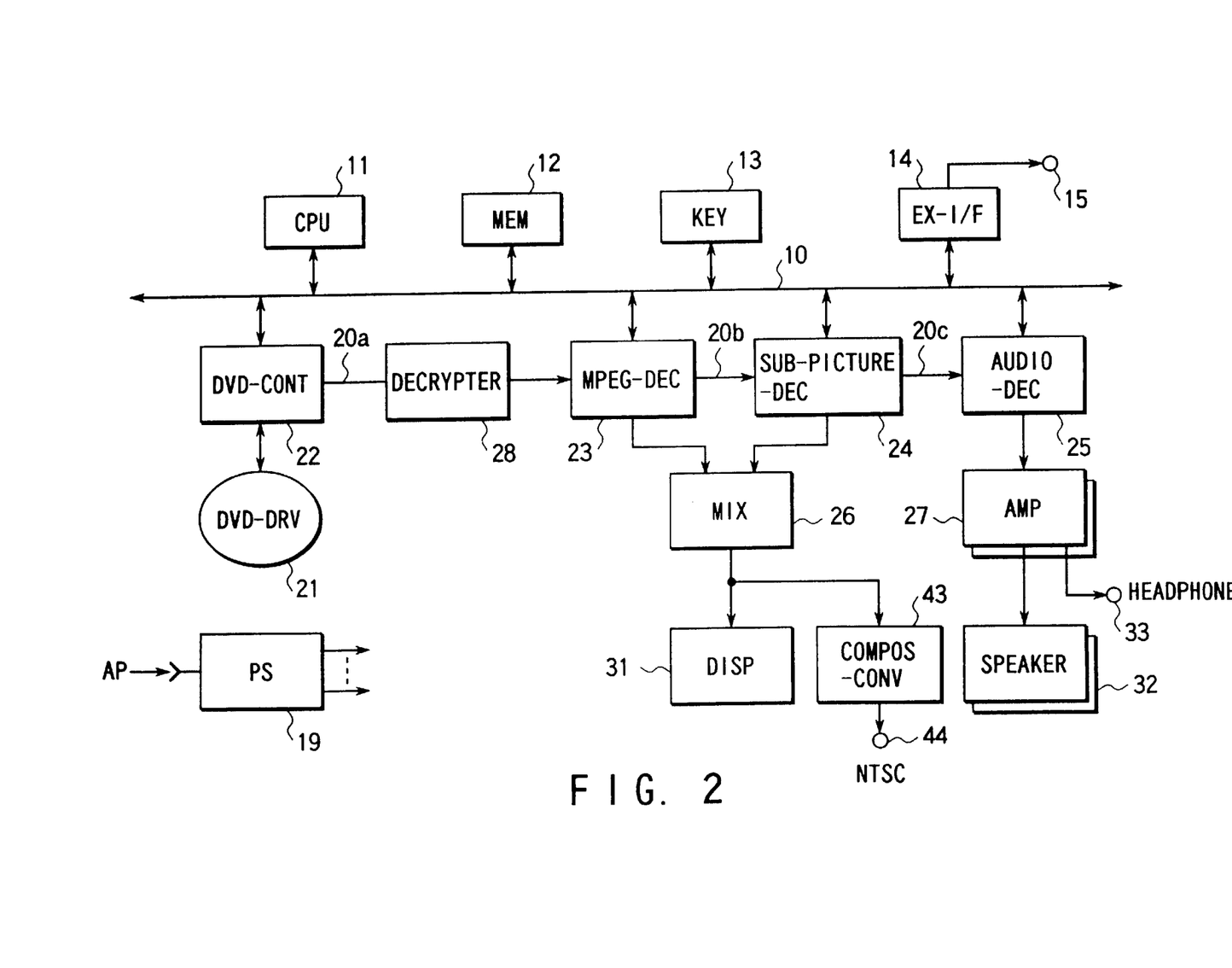
FIG. 2 is a block diagram showing an arrangement within a frame of the portable-type DVD player according the second embodiment of the present invention.

FIG. 2 is a block diagram showing an arrangement wihtin a frame of the portable DVD player according to a second embodiment of the present invention. In FIG. 2, the same numerals are used for the same parts as in FIG. 1, and thus the description thereof will be omitted.

The second embodiment differs from the first embodiment in that, in addition to the function of reproducing data recorded on the DVD while carrying in arbitrary places as well as indoors, the DVD player may be used as a monitor drive for an exernal large screen CRT monitor, as a stand-alone DVD player, and a personal computer terminal.

In FIG. 2, the composite converter (COMPOS-CONV) 43 converts the reproduced output image data for display generated by the video mixer (MIX) 26 into the NTSC signal for an external CRT display monitor. The converted NTSC signal is output externally via the NTSC output terminal 44. The composite converter (COMPOS-CONV) 43 may be implemented by the well-known art.

According to the structure described above, the motion picture/still picture data reproduced from the DVD can be displayed not only on the display unit (DISP) 31 using the flat panel display, but also on the external CRT monitor. Further, the monitor picture data output from the DVD-CONT 22 encoded based on MPEG1 or MPEG2, and the combined image data of the data decoded by the video decoder 23 and the sub-picture decoder 24, can be selectively output to an external personal computer from the communication port 15 and through the data buffer area in the internal memory (MEM) 12. Performing encryption process on the data output via the communication port 15 under control of the CPU 11 can avoid an illegal copying. Any well-known arts are available to encrypt the DVD stream data.

Figure 3:
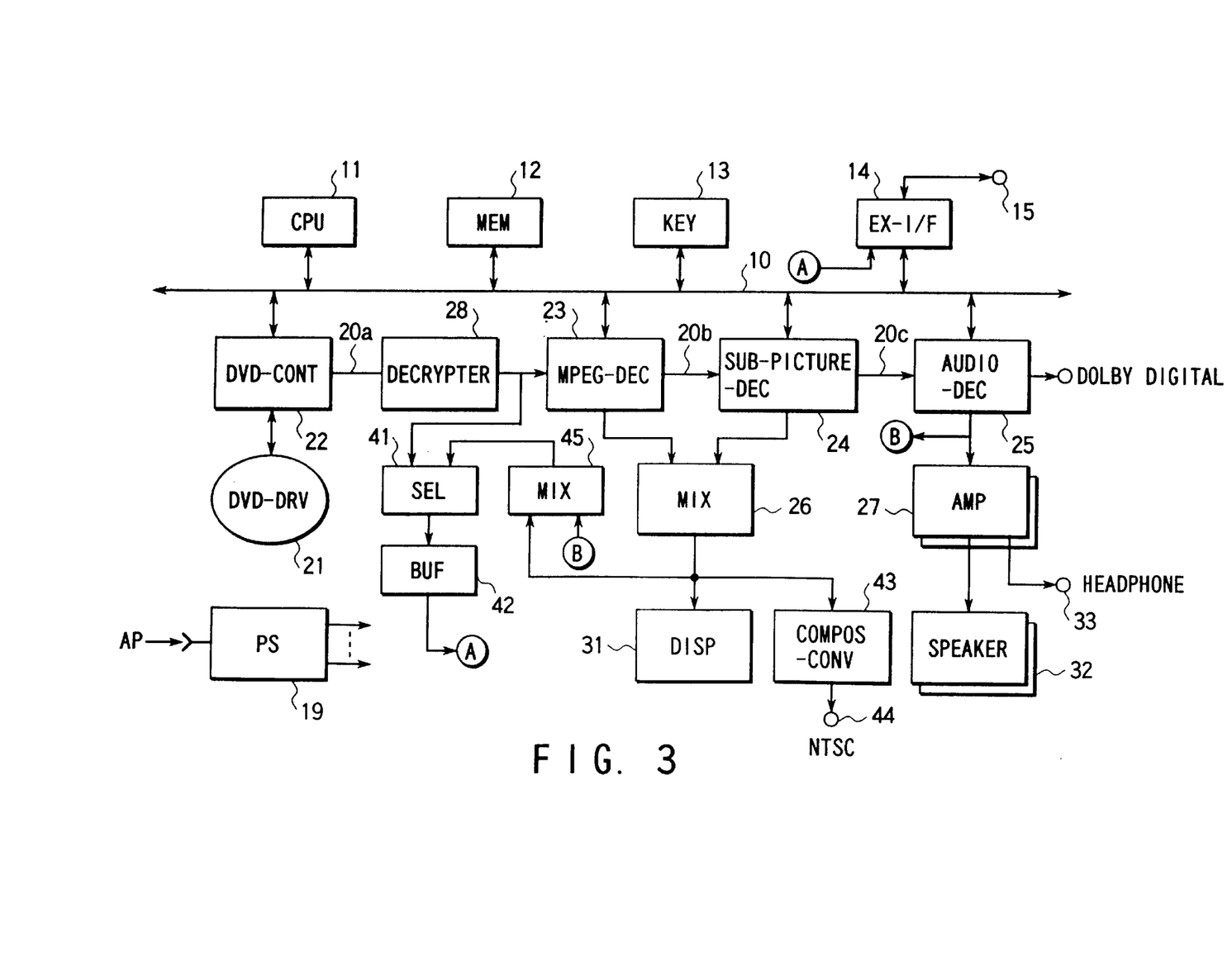
FIG. 3 is a block diagram showing an arrangement within a frame of the portable-type DVD player according the third embodiment of the present invention.

FIG. 3 is a block diagram showing an arrangement within a frame of the portable DVD player according to the third embodiment of the present invention. In FIG. 3, the same reference numerals are used for the same parts as those in FIGS. 1 and 2. The same components as those in FIGS. 1 and 2, and the description thereof will be omitted.

The third embodiment differs from the second embodiment in that the encoded motion picture data output from the DVD-CONT 22 and the mixed image data of the data decoded by the video decoder 23 and the sub-picture decoder 24 are selected and output to the communication interface (EX-I/F) 14 through a dedicated data transfer path. Thus, no load is applied to the internal memory (MEM) 12 and the system bus 10 at all when a large amount of video data is transferred.

In FIG. 3, the video/audio mixer (MIX) 45 mixes the audio signal output from the audio decoder (Audio-DEC) 25 such as the Dolby Digital audio signal, and the decoded mixture data of the video data and the sub picture data output from the video mixer (MIX) 26.

The video/audio selector 41 selects, in response to a selection control signal from a computer connected through the communication port 15, the encoded motion picture data (data prior to decoding) output from the DVD-CONT 22 or the decoded video/audio data output from the mixer 45, and outputs the selected data to the communication interface (EX-IF) 14 through the image data buffer (BUF) 42. Note that the stream data output from the DVD-CONT 22 is decrypted and supplied to the video data selector (SEL) 41 if the data has been encrypted.

The image data buffer (BUFF) 42 is used to transfer to the communication interface (EX-I/F) 14 the reproduced output image data for display and audio data mixed by the video/audio mixer (MIX) 45.

Further, in the third embodiment, a digital audio output terminal of DOLBY DIGITAL (5.1 channel) may be added to the audio decoder (AUDIO-DEC) 25 and a DOLBY DIGITAL amplifier may be externally connected to the terminal, resulting in high-quality surround audio.

According to the third embodiment, the motion picture/still picture data reproduced from DVD can be displayed on the display unit (DISP) 31 using the flat panel display as well as on the external CRT monitor.

Furthermore, the motion picture data output from the DVD-CONT 22 and encoded in accordance with MPEG1 or MPEG2, or the mixed image data of the data decoded by the video decoder (MPEG-DEC) 23 and the sub picture decoder (Sub-Picture-DEC) 24 can be selected and output to an external computer through the communication port 15.

Furthermore, the selected large amount of video data can be transferred to the external personal computer through the communication interface (EX-I/F) 14 through the dedicated data transfer path without burdening the internal memory (MEM) 12 and the system bus 10 with a load.

Further, the data output from the communication port 15 may be encrypted under the control of the CPU 11, thereby prohibiting illegal copying.

Figure 5A:
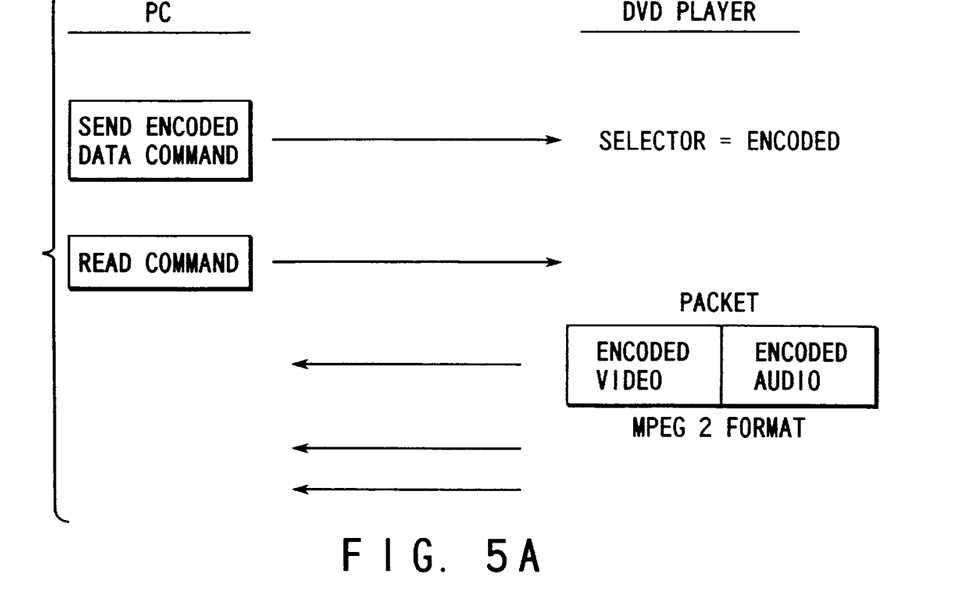
Figure 5B:
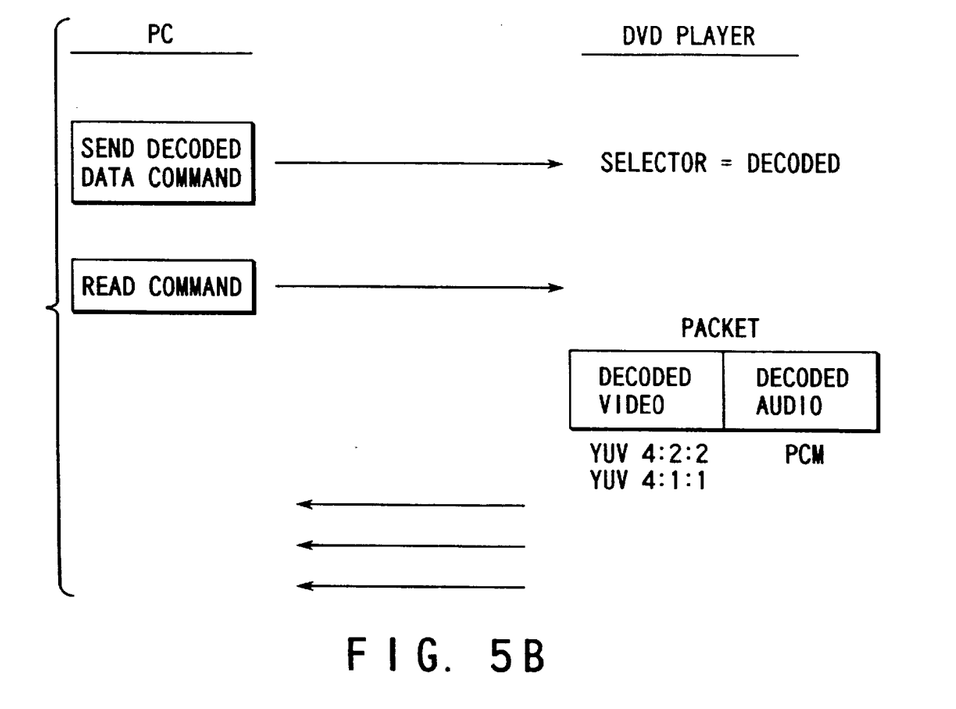

FIGS. 5A and 5B are diagrams showing command sequences between the computer and the portable DVD player for selecting and outputting, in response to commands from the computer connected through the communication port, the encoded stream data or the decoded video data and audio data for reproduction. FIG. 5A illustrates an example of a command sequence requesting selection and output of the encoded stream data and FIG. 5B illustrates an example of a command sequence requesting selection and output of the decoded video/audio data for reproduction.

For selection of the coded stream data in FIG. 5A, the computer (PC) sends a command requesting the coded data to the portable DVD player via the communication port 15. Responding to the command, the portable DVD player (the CPU 11) controls switching of the video data selector (SEL) 41 so as to select the coded DVD stream data. Thereafter, it prepares, for example, packets containing the video data and the audio data coded pursuant to MPEG 2 format, thus sequentially forwarding them toward the computer via the communication port 15.

On the other hand, for selection of the decoded video/audio data for reproducing in FIG. 5B, the computer (PC) sends a commands requesting the decoded data to the portable DVD player. In response to the command, the DVD player (the CPU 11) controls switching of the video data selector (SEL) 41 so as to select the decoded video/audio data for reproducing. Subsequently, it forms, for example, packets involving the video data decoded according to YUV 4:2:2 format or YUV 4:1:1 format and the audio data decoded according to PCM (Pulse Code Modulation) format, thereby transferring them to the computer via the communication port 15 in turn.

The portable DVD player of the above embodiments should not be taken to limit each configuration and each function therein to themselves. For example, other structures or configurations, such as a configuration having a DVD tray moving horizontally; a configuration having a plurality of communication interfaces, e.g., SCSI interface, IEEE 1394 interface, and PC card interface; a configuration having a function of reproducing CD-ROM and music CD; and a configuration having a television tuner are available.

Further, the above display unit may be arranged such that it serves as a cover when not used and it is swingable and detachable with respect to the main body. Such structure facilitates carrying by removing the display unit 31 from the main body when the headphone is connected to the headphone terminal 33 for playing the music CD.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A portable-type digital versatile disk (DVD) player, comprising:
    a frame having a top surface in which a disk opening for loading and ejecting the DVD is formed, and having a front side surface in which an elongated recess is formed;
    a display unit rotatably connected to a back side surface of the frame through a hinge, the display unit swinging between an open position of which a screen is viewable and a closed position in which the screen is not viewable;
    a switch unit provided in the display unit, for switching power supply for the DVD player on and off in accordance with an open/close operation of the display unit;
    an inner cover having a lip extending into the elongated recess of the front side surface of the frame;
    a key input section provided on the top surface of the frame, the section being arranged to avoid overlapping with the inner cover and the disk opening;

a DVD drive unit mounted within the frame for driving the DVD containing MPEG stream data;

an MPEG decoder for receiving and decoding the MPEG stream data read from the DVD; and stereo speakers mounted on both sides of the display unit.

2. A portable-type digital versatile disk (DVD) player comprising:

a frame having a top surface in which a disk opening for loading and ejecting the DVD is formed;

a display unit rotatably connected to a back side surface of the frame through a hinge, the display unit swinging between an open position of which a screen is viewable and a closed position in which the screen is not viewable;

a switch unit provided for switching power supply for the DVD player on and off;

an inner cover for covering the DVD drive arranged within a drive opening;

a key input section provided on the top surface of the frame, the section being arranged to avoid overlapping with the inner cover and the disk opening;

a DVD drive unit mounted within the frame for driving the DVD to read a MPEG stream data;

an MPEG decoder for decoding the MPEG stream data read from the DVD drive unit;

an external-interface unit for communicating with an external computer;

a dedicated bus unit for selectively transforming the MPEG stream data from one of the DVD drive units and the MPEG decoder to the external-interface unit; and stereo speakers mounted on both sides of the display unit.

3. A portable-type digital versatile disk (DVD) player, comprising:

a frame having a top surface in which a disk opening for loading and ejecting the DVD is formed;

a display unit rotatably connected to a back side surface of the frame through a hinge, the display unit swinging between an open position of which a screen is viewable and a closed position in which the screen is not viewable;

a switch unit provided for switching the power supply for the DVD player on and off;

an inner cover for opening the DVD drive arranged within a drive opening;

a key input section, including a plurality of keys, provided on the top surface of the frame, the section being arranged to avoid overlapping with the inner cover and the disk opening;

a DVD drive unit mounted within the frame for driving the DVD to read a MPEG stream data;

an MPEG decoder for decoding the MPEG stream data read from the DVD drive unit, thereby generating a video data;

a sub-picture decoder for decoding the MPEG stream data read from the DVD drive unit, thereby generating a sub-picture data;

a mixer unit for synthesizing the video data and the sub-picture data into a play back image; and stereo speakers mounted on both sides of the display unit.

4. A portable-type digital versatile disk (DVD) player, comprising:

a frame having a top surface in which a disk opening for loading and ejecting the DVD is formed, and having a front side surface in which an elongated recess is formed;

a display unit rotatably connected to a back side surface of the frame through a hinge, the display unit swinging between an open position of which a screen is viewable and a closed position in which the screen is not viewable;

a switch unit provided in the display unit, for switching power supply for the DVD player on and off in accordance with an open/close operation of the display unit;

an inner cover having a top surface and a lip extending into the elongated recess of the front side surface of the frame;

key input section provided beside the top surface of the inner cover;

a DVD drive unit mounted within the frame for driving the DVD containing MPEG stream data;

an MPEG decoder for receiving and decoding the MPEG stream data read from the DVD; and stereo speakers mounted on both sides of the display unit.

5. A portable-type digital versatile disk (DVD) player comprising:

a frame having a top surface in which a disk opening for loading and ejecting the DVD is formed; a display unit rotatably connected to a back side surface of the frame through a hinge, the display unit swinging between an open position of which a screen is viewable and a closed position in which the screen is not viewable;

a switch unit provided for switching power supply for the DVD player on and off;

an inner cover, having a top surface, for covering the DVD drive arranged within a drive opening;

a key input section provided beside the top surface of the inner cover;

a DVD drive unit mounted within the frame for driving the DVD to read a MPEG stream data;

an MPEG decoder for decoding the MPEG stream data read from the DVD drive unit;

an external-interface unit for communicating with an external computer;

a dedicated bus unit for selectively transforming the MPEG stream data from one of the DVD drive units and the MPEG decoder to the external-interface unit; and stereo speakers mounted on both sides of the display unit.

6. A portable-type digital versatile disk (DVD) player, comprising:

a frame having a top surface in which a disk opening for loading and ejecting the DVD is formed;

a display unit rotatably connected to a back side surface of the frame through a hinge, the display unit swinging between an open position of which a screen is viewable and a closed position in which the screen is not viewable;

a switch unit provided for switching the power supply for the DVD player on and off;

an inner cover, having a top surface, for opening the DVD drive arranged within a drive opening;

a key input section provided beside the top surface of the inner cover;

a DVD drive unit mounted within the frame for driving the DVD to read a MPEG stream data;

an MPEG decoder for decoding the MPEG stream data read from the DVD drive unit, thereby generating a video data;

a sub-picture decoder for decoding the MPEG stream data read from the DVD drive unit, thereby generating a sub-picture data;

a mixer unit for synthesizing the video data and the sub-picture data into a play back image; and stereo speakers mounted on both sides of the display unit.

7. A portable-type digital versatile disk (DVD) player, comprising:

a frame having a top surface in which a disk opening for loading and ejecting a DVD is formed;

a display unit rotatably connected to a back side surface of the frame through a hinge, the display unit swinging between an open position in which a screen is viewable and a closed position in which the screen is not viewable;

a switch unit provided for switching a power supply for the DVD player on and off;

an inner cover for covering the disk opening;

a key input section, including a plurality of keys, provided on the surface of the frame, the section being arranged to avoid overlapping with the inner cover and the disk opening;

a DVD drive unit mounted within a frame for driving the DVD to read a MPEG stream data;

an MPEG decoder for decoding the MPEG stream data read from the DVD drive unit; and a pair of stereo speakers, each speaker being mounted on a respective side of the display unit.

8. A portable-type digital versatile disk (DVD) player, comprising:

a frame having a top surface in which a disk opening for loading and ejecting a DVD is formed;

a display unit rotatably connected to a back side surface of the frame through a hinge, the display unit swinging between an open position in which a screen is viewable and a closed position in which the screen is not viewable;

a switch unit provided for switching a power supply for the DVD player on and off; an inner cover for covering the disk opening;

a key input section, including a plurality of keys, provided on the top surface of the frame, the section being arranged to avoid overlapping with the inner cover and the disk opening;

a DVD drive unit mounted within the frame for driving the DVD to read a MPEG stream data;

an MPEG decoder for decoding the MPEG stream data read from the DVD drive unit;

a pair of stereo speakers, each speaker being mounted on a respective side of the display unit; and a power supply circuit, for driving the DVD player, to which a battery is connected.

9. A portable-type digital versatile disk (DVD) player, comprising:

a frame having a top surface in which a disk opening for loading and ejecting a DVD is formed;

a display unit rotatably connected to a back side surface of the frame through a hinge, the display unit swinging between an open position in which a screen is viewable and a closed position in which the screen is not viewable;

a switch unit provided for switching a power supply for the DVD player on and off;

an inner cover for covering the disk opening;

a key input section, including a plurality of keys, provided on the top surface of the frame, the section being arranged to avoid overlapping with the inner cover and the disk opening;

a DVD drive unit mounted within the frame for driving the DVD to read a MPEG stream data;

an MPEG decoder for decoding the MPEG stream data read from the DVD drive unit;

a pair of stereo speakers, each speaker being mounted on a respective side of the display unit; and a power supply circuit for driving the DVD player to which a battery and an external power supply are connected, wherein the circuit charges the battery when the external power supply is connected to the circuit.

* * * * *